United States Patent [19]

Miller

[11] 4,088,621

[45] May 9, 1978

[54] COATING COMPOSITIONS

[75] Inventor: Russell C. Miller, Chicago, Ill.

[73] Assignee: J. M. Eltzroth & Associates, Inc., Schaumburg, Ill.

[21] Appl. No.: 662,726

[22] Filed: Mar. 1, 1976

Related U.S. Application Data

[63] Continuation-in-part of Ser. No. 505,212, Sep. 12, 1974, abandoned.

[51] Int. Cl.² ............................................. C08L 33/04
[52] U.S. Cl. ................................. 260/29.6 S; 106/302; 106/306; 148/6.16; 148/6.2; 260/29.6 NR; 260/29.6 M; 260/29.6 MM; 423/332; 423/341; 427/435; 427/437; 428/411
[58] Field of Search ................... 260/29.6 S, 29.6 NR, 260/29.6 M, 29.6 MM; 106/306, 302; 148/6.16, 6.2; 423/332, 341; 427/435, 437; 428/411

[56] References Cited

U.S. PATENT DOCUMENTS

| | | | |
|---|---|---|---|
| 3,026,281 | 3/1962 | Harren et al. | 260/29.6 MM |
| 3,053,691 | 9/1962 | Hartman et al. | 260/29.6 M |
| 3,585,084 | 6/1971 | Steinbrecher et al. | 148/6.2 |
| 3,592,699 | 7/1971 | Steinbrecher et al. | 148/6.2 |
| 3,907,737 | 9/1975 | Marx et al. | 260/29.6 NR |
| 3,936,546 | 2/1976 | Hall | 427/435 |

OTHER PUBLICATIONS

Baras et al., Chem. Abstracts, vol. 77, 50253v, 1977.

*Primary Examiner*—M. J. Welsh
*Attorney, Agent, or Firm*—Richard L. Johnston

[57] ABSTRACT

A process is provided for coating a metal substrate to give new and improved results in the preparation of resin coated metals, particularly steel, aluminum, magnesium, and zinc surfaced articles including galvanized iron or steel.

6 Claims, No Drawings

COATING COMPOSITIONS

This application is a continuation-in-part of U.S. Ser. No. 505,212, filed Sept. 12, 1974 and now abandoned.

BACKGROUND

It is well known in the metal coating industry that there is a continuing need for coatings used for paint bonding and corrosion resistance. This is especially true where the metal is steel, aluminum, magnesium, aluminum alloys and zinc surfaces articles including galvanized iron or steel, where such coatings are required in order to protect the articles against deterioration.

In the past many such coatings have been suggested and used such as phosphate, zincate and anodized films but, in general, these coatings have left much to be desired because of various deficiencies including complex and often difficult operating procedures and high costs.

Chromate conversion coatings have been used with varying degrees of success. The effective protective ingredient in these coatings seems to be chromium in the hexavalent state. It has long been recognized that it would be desirable to combine in a single coating composition an organic resinous film forming component which is water insoluble and chromium in a hexavalent state. In particular it would be desirable to prepare an emulsion coating composition containing the resinous organic film-forming component in the discontinuous phase and water in the continuous phase, together with chromium in a hexavalent state. If this could be done, latex emulsion paints such as, for example, acrylic emulsion paints, could be applied to metal substrates and a single coating would give a combined beneficial effect due to the presence of the chromium in the hexavalent state as well as the film-forming protective properties of the organic resin. Unfortunately, attempts to accomplish this result have not been successful primarily for the reason that the addition of the chromium in a hexavalent state by the usual means employing potassium dichromate, sodium dichromate, ammonium dichromate, (and their respective chromates) or chromic acid causes coagulation of the emulsion, produces large amounts of sediment, and destroys its capability of being applied as a uniform coating.

OBJECTS

One of the objects of the present invention is to provide a new and improved process for incorporating chromium in a hexavalent state into an emulsion coating composition of the type in which the discontinuous phase contains at least one water insoluble particulate film-forming organic thermoplastic resin and the continuous phase contains water by adding to such emulsion a hexavalent chromium compound in such a way that coagulation of the emulsion does not occur.

Another object of the invention is to produce new and improved hexavalent chromium containing emulsion coating compositions of the type described which are stable and have a substantially shelf life.

Still a further object of the invention is to provide a new and useful type of water insoluble pigment which is especially useful in the preparation of emulsion coating compositions of the type described.

Another object of the invention is to provide a process of coating metals especially steel, aluminum, magnesium and zinc surfaced metals including galvanized iron or steel wherein the applied coatings not only enhance corrosion resistance but also when used as primer coatings will adhere to subsequently applied finishing coatings. Other objects will appear hereinafter.

BRIEF SUMMARY OF THE INVENTION

In accordance with the invention a process is provided for preparing a hexavalent chromium containing emulsion coating composition without causing coagulation of the emulsion and for producing an emulsion coating composition containing chromium in the hexavalent state and at least one water insoluble particulate film-forming organ thermoplastic resin by mixing a body of an emulsion coating composition containing water in the continuous phase and in the discontinuous phase at least one water insoluble particulate film-forming organic thermoplastic resin with a gradually added dilute aqueous solution of an inorganic ionizable water soluble hexavalent chromium compound having a concentration of 1% to 10% by weight, calculated as Cr, while cooling and maintaining a pH within the range of 2 to 10.5 and maintaining said body in a non-foaming state. The process is preferably carried out by causing the body of emulsion to rotate and gradually adding the dilute solution to a peripheral portion of the rotating body.

As a further feature of the invention, if it is desired to incorporate a water insoluble pigment into the emulsion coating composition, the thermoplastic resin used in forming the emulsion is divided into two parts, the first part being emulsified in water and mixed with said aqueous solution of said water soluble hexavalent chromium compound in the manner previously described, and the second part being mixed with said pigment in sufficient proportions to coat said pigment, and thereafter combining said first and second parts.

Another embodiment of the invention involves the use of a particular type of pigment and a process of making them, said pigment consisting essentially of $CaSiF_6$ and 0% to 10% by weight, calculated as Cr, of hexavalent chromium added as an inorganic ionizable water soluble hexavalent chromium compound.

The invention also involves the provision of a process for preparing a pigment of the type previously described in which an inorganic calcium compound and an inorganic silicofluoride are mixed in equimolecular proportions in sufficient water to form a thick slurry, the resultant mixture is neutralized and thereafter dried and ground.

In addition, the invention involves the use of the aforesaid emulsion coating compositions under controlled conditions for coating a metal substrate, more particularly, steel, aluminum, magnesium, and zinc surfaced metals including galvanized iron or steel, wherein the applied coatings not only enhanced corrosion resistance but also, when used as primer coatings, will adhere to subsequently applied finishing coatings.

DETAILED DESCRIPTION OF THE INVENTION

Coating compositions which comprise water as the continuous phase and contain in the discontinuous phase at least one water insoluble particulate film-forming organic thermoplastic resin, with or without thermosetting resins, are well known in the art. Compositions of this type have been widely used for painting or coating metal and for many purposes they are quite satisfactory. In general, however, they leave much to be desired from the standpoint of corrosion inhibition and the ability to withstand salt spray and exposure to boiling water. Generally speaking, these compositions deteriorate when exposed to salt spray and suffer from the disadvantage that after being dried out or cured, when applied as a coating to a metal they will reabsorb moisture in the presence of heat. This in turn causes peeling, and peeling will occur, for example, when a metal coated with one of these compositions is alternately exposed to the sun's rays followed by a rain storm. As a result, so far as is known, no practical method has been devised for providing highly corrosion resistant coatings which are also resistant to the reabsorption of water when such coatings have been derived from conventional pigmented or unpigmented emulsion type coating compositions of the kind previously described.

Although it is known that hexavalent chromium when applied as a coating to metal has a corrosion inhibiting effect, chromium in the hexavalent state as, for example, in the form of sodium dichromate potassium dichromate, ammonium dichromate, (or their respective chromate salts) or chromic acid, when mixed in a conventional manner with an emulsion of the type described causes coagulation thereby making the resultant emulsion unfit for use as a composition for coating and forming a film on a metallic substrate.

This tendency to coagulate such emulsions is apparently due to the strong oxidizing effect of the aforesaid chromium compounds not only upon resinous components of the emulsion but also upon other components that are normally present in such emulsions such as, for example, alcohols and glycols. The reaction between these hexavalent chromium compounds and the aforesaid components of the emulsion is quite rapid if the chromium compounds are added either in a solid state or in concentrated liquid form or if the emulsion is foaming.

It has been discovered in accordance with this invention, however, that by using a dilute aqueous solution of an inorganic ionizable water soluble hexavalent chromium compound having a concentration of 1% to 10% by weight and by adding such solution gradually to a peripheral portion of a body of the emulsion, or sections having rapid movement to disperse and dilute active chromium compound in the fastest possible manner, while agitating the emulsion in such a way as to rotate it, for example, by means of a centrally disposed paddle or other suitable means effective to produce non-violent agitation, it is possible to incorporate hexavalent chromium into an emulsion of the type described without causing "shock" or coagulation of the emulsion. Inasmuch as the reaction between hexavalent chromium compounds and the components of the emulsion is exothermic and occurs rapidly, it is also desirable to cool the emulsion while the dilute aqueous solution of the water soluble hexavalent chromium compound is being added thereto. In addition, it is quite important to maintain the body of emulsion in a non-foaming state because the reaction of the hexavalent chromium compound with foam particles is extremely rapid. Moreover, the pH of the emulsion should be maintained within a range of 2 to 10.5. Preferably, the dilute aqueous solution of the water soluble hexavalent chromium compound is added dropwise to the main body of emulsion. It is also preferable to use as the chromium compound either sodium dichromate, potassium dichromate, sodium chromate, potassium chromate (at least in part) or ammonium dichromate or mixtures thereof. These compounds when dissolved in water are acidic but not as acidic as chromic acid and therefore make the control of the reaction simpler.

It is usually preferable to maintain a temperature in the emulsion while carrying out the aforesaid process within the range of 70° F. to 80° F. In general, the temperature should be above that giving ice crystal formation and not above 90° F. It is also preferable to rotate the body of the emulsion slowly, for example, 1 to 60 revolutions per minute. The speed of rotation will vary depending upon the size of the container. For example, a one liter container would be only six inches in diameter while a 55 gallon drum might be 30 inches in diameter and a larger vessel of the type used in carrying out chemical reactions might be six feet or more in diameter. Inasmuch as the dilute solution of the hexavalent chromium compound is added to a peripheral portion or sections having the greatest movement of the rotating body of emulsion, the speed of rotation could be greater in a larger container.

The foregoing process is applicable to any emulsion coating composition containing water as the continuous phase and in the discontinuous phase one or more water insoluble particulate film-forming organic thermoplastic resins which are normally reactive with hexavalent chromium, with or without one or more thermosetting resins, which are added to increase the impermeability of a coating when the coating composition is applied to a substrate. A particular type of thermoplastic resin emulsion is one containing 100% acrylic emulsion polymer comprising 46±0.5% by weight solids having a pH of 9 to 11 and weighing approximately 8.9 pounds per gallon. Such an acrylic emulsion polymer is available commercially under the name Rhoplex MV-1.

A preferred thermosetting resin for use in the practice of the invention is an acrylic emulsion polymer containing 46±0.5% by weight solids having a pH of 9.5 to 10.5 and weighing approximately 9 pounds per gallon. Such a resin is available commercially under the name Rhoplex AC-604. Examples of other suitable resins are those sold under the names Rhoplex B-5 and Rhoplex AC-33X.

While the foregoing resins are preferred in the practice of the invention, the invention in its broadest aspects is not limited to these particular resins. The types of resins used are many, e.g., vinyl, polyester, epoxy and acrylic, either simple or modified, or mixed; cross linking additives such as, for example, melamine resins, methylated urea formaldehyde and synthetic type rubber type resins can be used.

Typical examples of resin combinations are thermoplastic (e.g., Rhoplex MV-1)-thermosetting (e.g., Rhoplex AC-604); thermoplastic (e.g., Rhoplex MV-1)-thermosetting (e.g., Rhoplex AC-604)-thermosetting (Epoxy PR-808); thermoplastic (e.g., Rhoplex MV-1)-thermosetting (e.g., Rhoplex B-5)-thermosetting (e.g., Rhoplex E-1046) cross linking (e.g., Uformite M83, a melamine resin); and thermoplastic (e.g., Rhoplex MV-1)-thermosetting (e.g., Rhoplex B-5)-thermosetting (e.g., Rhoplex AC-33X and Rhoplex E-1046)-cross linking (e.g., HYCAR CTBN, Uformite M-83, and Beetle 65).

The various resins are formulated into emulsions in a conventional manner by mixing them in water with various additives including dispersion agents, surfactants, defoamers, coalescing agents, coupling agents, flow control agents, pH control agents and viscosity control agents. The variety of these additives is quite large in number and while the end product produced will have somewhat different chemical and physical characteristics depending upon the particular additives, except to the extent herein described, the invention is not limited to particular additives. Examples of suitable coupling agents normally employed in making such emulsions are isopropyl alcohol, N-butyl alcohol, and tertiary butyl alcohol. Examples of suitable coalescing agents are butyl Cellosolve, butyl carbitol and tributyl phosphate. Hydrolyzable esters and water soluble substances detract from shelf life and water and vapor insensitivity.

The preferred pH control materials are ammonium hydroxide, dimethylethanolamine, and diethanolamine. These substances are alkaline as contrasted with the aqueous solutions of the dichromates which are acidic. Tertiary amines such as dimethylethanolamine are preferred from the standpoint of enhancing the stability of the resultant emulsions with which the hexavalent chromium compounds have been incorporated. Diethanolamine also gives good results. The use of ammonium hydroxide is also effective but with the stability somewhat less. However, the use of ammonium hydroxide has the advantage that it decomposes more easily after the emulsion coating composition has been applied to a substrate and during the curing process. For this reason it is usually desirable to add the hexavalent chromium as ammonium dichromate. It is also customary to use the pH control agents in the form of aqueous solutions, for example, ammonium hydroxide as a 28% aqueous solution and the amines diluted in equal weight proportions (i.e., 1:1) with water.

Examples of thickening agents are polyacrylic acid and salts thereof, for example, the sodium and ammonium salts such as Acrysol GS, Acrysol G-110 and Acrysol WS-24.

Examples of pigment dispersants, stabilizers and surfactants are those materials sold commercially under the names Tamol 731, Tamol 850, Triton CF-10 which is a water soluble nonionic oxyethylated benzyl ether of octyl phenol, Triton X-114 which is an oxyethylated octyl phenol, and Ethoxylan E which is lanolin reacted with ethylene oxide.

Conventional defoaming agents can be employed as, for example, the silicones and particular mention can be made of NOPCO NXZ, WITCO BALAB 768.

Various types of pigments can be added to the emulsion coating compositions including lead silicate, chromate pigments (e.g., Oncor-M50 which has a yellow brown color) and strontium chromate. However, for the purpose of the present invention a particularly useful pigment is one which so far as is known has not heretofore been prepared and is not available commercially. This pigment is prepared by mixing equimolecular proportions of an inorganic calcium compound and an inorganic silicofluoride in water sufficient to form a thick slurry, neutralizing the resultant mixture, drying and grinding. The sources of calcium are preferably calcium oxide, calcium hydroxide, calcium carbonate and calcium bicarbonate. The sources of $SiF_6$ are preferably $H_2SiF_6$ (26% solution in water), $(NH_4)_2SiF_6^-$ and $ZnSiF_6$.

The reaction is exothermic and the mixing container should be jacketed and water cooled. In order to prepare a pigment containing hexavalent chromium, chromic acid is used in the neutralization in amounts up to 10% by weight, calculated as Cr. If it is desired to prepare $CaSiF_6$ without chromium, another inorganic acid, e.g., phosphoric acid, is used as the neutralizing agent.

Excessive water can be removed from the completed product by allowing the reaction mixture to stand for 24 hours, then decanting or extracting the liquid surface layer. This material forms hard crystals which for the purpose of the present invention should be reduced to a particle size of 0.5 to 5 microns, either by ball milling or roller milling. Where the pigment contains hexavalent chromium its addition to an aqueous emulsion resin coating composition will enhance corrosion inhibition when the coating composition is applied to a metal substrate.

In general, emulsion coating compositions prepared in accordance with the invention will have a solids content, excluding pigmentation, within the range of 15% to 35% by weight.

A given emulsion coating composition might be modified depending upon the type of application, i.e., roll coating, spray coating, immersion and squeegee applications, electrostatic applications and other methods of application.

Where the emulsion coating composition contains both thermoplastic resins and thermosetting resins the weight ratio of thermoplastic resins to thermosetting resins is preferably within the range of 6:1 to 3:1, the ratio however, can be altered at will. The more thermosetting resin used the less the water and vapor sensitivity and extensibility.

If a cross linking agent is employed, the amount is preferably at least 25% by weight of the resin to be cross linked.

Where pigments are added the weight ratio of pigment to resinous binder is usually within the range of 5:95 to 40:60, although it can be as low as 1:99.

In the application of the coating compositions to a substrate such as a metal, those skilled in the art will recognize that cleaning and preparation of the metal is quite important and may involve the usual cleaning methods, deoxidizing of the substrate, rinsing and drying.

After the emulsion coating composition is applied to a substrate, e.g., steel, aluminum, magnesium, or a zinc surfaced substrate, it is dried or allowed to dry and cured, for example, at 400° F. for from 60 seconds to three minutes or 600° F. from 30 to 90 seconds. Although the overall temperature range of curing is 400° F. to 600° F. for periods of time from 30 seconds to 3 minutes, the time of heating is longer at lower temperatures and shorter at the higher temperatures. The time-temperature relationship is preferably controlled to give a final coating having a pencil hardness of H to 2H.

The wet thickness of the applied coating is usually within the range of 0.05 mil to 10 mils (a mil equalling 0.001 inch). A preferred thickness of the wet coating is within the range of 0.1 to 0.3 mil. The greater the thickness of film the greater will be the difficulty of acquiring a uniformly "cured" film.

The quality of the cured coating can be tested in a number of ways. One such test is the salt spray test where a mist or fog of an aqueous solution containing 5% sodium chloride or acetic acid acidified sodium chloride is applied to coated panels over a predetermined time period.

Another type of test is the Q-Panel Humidity Panel Test in which the coated panel is subjected to humidities of 90 to 100% at temperatures of from 100° F. to 190° F. with drying in cyclical periods, the cycles being timed at 0 to 60 minutes under high humidity conditions and 0 to 60 minutes under drying conditions or in variation in 10 minute units of time.

Another test which is perhaps the most strenuous of all involves boiling the coated panels in distilled water for 30 minutes, 60 minutes or 120 minutes. The area being tested may or may not be impacted or bent. Usually a pencil hardness test is made before and after the test (allowing 5 to 15 minutes recovery at room temperature). Observation can be made for resistance to solvation of coating, chalking of coating and water absorption. A good film or coating should be capable of returning to its original condition after this test.

Other tests can be conducted to determine resistance to over-bake cure using pencil hardness, impact tests and bend tests. Continuity of film can be determined by using the Preece or modified Preece tests with acidified copper sulfate solution.

As previously indicated the composition of the emulsion to be applied as a coating may vary somewhat depending upon the nature of the substrate. Thus, in applying the emulsion coating compositions to aluminum (this term also includes aluminum alloys) experience has shown that excellent results are obtained either with high or low hexavalent chromium contents and either at low pH's or high pH's, although the pH is preferably within the range from 5.8 to 10.5. On the other hand, when the emulsion coating compositions are applied to steel, the pH should be below 7.0. In the treatment of galvanized iron or steel (i.e., zinc surfaced articles), it is preferable to have the hexavalent chromium present in amounts such that a coating of the emulsion coating composition on the substrate contains not more than 10 micrograms per square inch of hexavalent chromium, as Cr, and the pH is preferably 6.8 tp 8.0 for best results. If too much hexavalent and active chromium is present it reacts with the zinc forming zinc chromates which tend to form a powder and give poor adhesion where a finishing top coat is applied.

The application of the emulsion coating compositions to magnesium (which includes magnesium alloys) is similar to that for aluminum although magnesium is very sensitive to low pH values below 5.0.

The invention will be further illustrated but is not limited by the following examples in which the quantities are given in parts by weight unless otherwise indicated.

EXAMPLE I

An emulsion coating composition was prepared as follows:

Four gallons of an acrylic emulsion polymer containing 46±0.5% solids and having a pH of 9 to 11 (Rhoplex MV-1) was mixed with a premix of 15 to 30 ml of tributyl phosphate and 3 to 10 ml of a defoaming agent (NOPCO NXZ) and agitated thoroughly until no fish eyes or agglomerates appeared on a fineness of grind gauge. 1 to 2 gallons of water was added and to the resultant emulsion while it was being rotated with a paddle-type agitator there was added dropwise at the periphery of the emulsion body a dilute solution of sodium dichromate in water containing one gram of sodium dichromate per 10 ml of solution until a pH value of 6.6 to 6.8 was obtained. The resultant emulsion was then filtered.

A coating of the foregoing emulsion was applied using a draw bar to a thickness of 0.05 mil to 1.0 mil thickness on aluminum panels of No. 3003 alloy having a gauge thickness of 0.019 to 0.025. These panels had previously been alkaline cleaned. Some were chromate conversion coated. Others were rinsed with water and then acid rinsed with chromic acid-phosphoric acid mixtures and dried prior to the application of the coating.

The coatings were cured by preheating at 120° F. to 160° F. for 20 to 40 seconds followed by complete cure in 45 to 60 seconds at 600° F. Panels of the cured coatings were bent and the edge of the bend exposed to 60 inch-lbs. direct impact. There was no "pull away" using 3M-600 tape.

EXAMPLE II

A coating composition was prepared by mixing 20 ml of an acrylic emulsion polymer of the type described in Example I with 20 ml of water and adding dilute sodium dichromate dropwise in the manner described in Example I until the pH was 6.6 and thereafter adding aqueous ammonium hydroxide (28%) to a pH of 9.0 to 9.5.

To this composition there was then added 60 ml of a thermosetting acrylic emulsion polymer (Rhoplex AC-604) having a solids content of 46±0.5% and a pH of 9.5 to 10.5. To this composition there was also added 10 ml of an epoxy resin (Ciba-Geigy Pro-808) having a pH of 7.5 and a premix of 5 ml of tributyl phosphate and 1 ml of a defoaming agent (NOPCO NXZ). In addition 1 ml of propylene glycol and 3 ml of n-butyl alcohol were added and the composition was mixed until clear of all fish eyes and agglomerates.

The foregoing composition was applied to a hot dip galvanize 0.025 gauge metal panel which had previously been cleaned and prepared. A draw bar was used to apply a coating of 0.2 mil wet film.

The coated panel was then preheated to 160° F. for 30 seconds and cured at 600° F. for 75 seconds. It had a pencil hardness of 2H and after 60 minutes in boiling water with a 15 minute recovery time the pencil hardness was 2H/H.

Impact tests on the coated panel were carried out with excellent results.

EXAMPLE III

A pigment was prepared by mixing together in water 1 pound of slaked lime $(CaOH)_2$, 1 liter of water and 15 ml of a surfactant (Triton CF-10) to form a paste. 26% fluosilicic acid was then slowly added with thorough mixing until a pH of 8.0 was obtained. The reaction was highly exothermic and the mixer was water cooled. Thereafter, chromic acid was added until the pH was 7.0. This gave a pigment containing hexavalent chromium. If the addition of chromium is not desired, another acid such as phosphoric is used to neutralize the composition to the desired pH of 7.0, immediately before using — this is a catalyst addition. The pH value can be altered.

In either case the resultant composition was then ground in a ball mill and about ½ pound of synthetic talc was used to reduce gloss.

One to two pounds of titanium dioxide were then added (duPont 966 $TiO_2$). A premix was prepared by mixing together 500 ml of tributyl phosphate, 100 ml of a defoaming agent (NOPCO NXZ), 1 gallon of propylene glycol and 75 grams of a pigment dispersant and stabilizer (Tamol 830) added to the foregoing composition. The resultant mixture was milled until no fish eyes, agglomerates or large particles appeared on a ground gauge and the particles had a size within the range of 0.5 to 5 microns.

1000 ml of thermoplastic acrylic emulsion polymer (Rhoplex MV-1) was then added and milled with the pigment until all of the pigment particles were uniformly coated.

In a slow paddle wheel mixer 5 gallons of the aforesaid thermoplastic acrylic emulsion polymer was mixed with 2 gallons of water and the pigmented mixture slowly added thereto. Thereafter a dilute solution of sodium dichromate containing 1% to 10% by weight hexavalent chromium, as Cr, was added dropwise to the peripheral portion of the rotating mixture until a pH of 7.6 to 7.8 had been obtained.

A diluted thickening agent was then added (Acrysol G-110) until a viscosity reading of 25/30 seconds was obtained using a Zahn No. 2 cup. 2 gallons of an acrylic thermosetting polymer (Rhoplex AC-604) were then added and the mixture was mixed slowly for at least 6 hours.

A coating of the foregoing emulsion was applied to both 3003 aluminum sheet and spangle hot dip galvanized sheet to a wet thickness of 0.2 mil using a draw bar. The coated hot dip galvanized sheet was preheated to 160° F. for 30 seconds and cured at 600° F. for 75 seconds. The coated aluminum sheet was preheated at 160° F. for 30 seconds and cured at 600° F. for 60 seconds. In each case the resultant coatings had a pencil hardness of 2H/H.

The hot dip galvanized coated sheet withstood the impact of 80 to 100 ft.-pounds and the coated aluminum sheet withstood impact of 30 ft.-pounds. The aluminum sheet after being bent withstood an edge impact of 60 ft.-pounds. The impact value (lbs/sq.in.) is that just before metal or crystal fracture occurs, thus, this value must be a variable.

Salt spray tests on both sheets were conducted to failure. The coated hot dip galvanized sheet ran 400 to 600 hours and the coated aluminum sheet ran over 1000 hours. On embossed aluminum sheeting a coating of the foregoing emulsion applied as previously described gave very superior results on sharply rounded areas as tested by the modified Preece copper sulfate test.

EXAMPLE IV 20 grams of lead-silicate-chromate pigment (ON-COR-M50), 10 grams of strontium chromate, 20 grams of water and 12 ml of a dispersant (Tamol 850) were ball mill ground to a particle size of 0.5 to 5 microns. 100 ml of acrylic polymer (MV-1), together with a premix of 5 ml of tributyl phosphate and 1 ml of a defoaming agent (NOPCO NXZ) were added and the grinding continued until all of the ingredients were uniformly dispersed. There was then added 100 ml of acrylic polymer (MV-1), 100 ml of acrylic thermosetting polymer (AC-604) and 100 ml of water and grinding continued for 30 minutes. The liquid mixture was then subjected to a slow speed agitator (1-60 rpm) and a dilute solution of sodium dichromate (1 gram in 10 grams of water) was added slowly to a pH of 6.8.

Using an 0.2 mil draw bar, coatings of the foregoing composition were applied to low carbon steel panels which had previously been cleaned and prepared and the coated panels were preheated at 160° F for 30 to 45 seconds, then cured at 600° F for 60 to 75 seconds.

The resultant coated panels withstood an impact of 160 ft./lbs. with no tape pullaway, a bend test with no visible fracture or tape pullaway and a salt spray test using a 5% sodium chloride mist with an exposure of 500 hours before signs of blister and corrosion, and no tape pullaway after 15 minutes recovery time.

EXAMPLE V 50 grams of strontium chromate, 50 grams of water and 13 ml of dispersant (Tamol 850) were mixed with a premix of 2 ml tributyl phosphate, 1 ml surfactant (Triton CF10), and 1 ml defoaming agent (NOPCO NXZ) and ball milled for 4 hours. 500 ml of thermoplastic acrylic emulsion polymer (RHOPLEX MV-1) was added to the mixture and ball milled for 30 minutes.

The resultant mixture was then subjected to slow agitation and 1000 ml of said thermoplastic acrylic polymer (MV-1) and 500 ml of an acrylic thermosetting polymer (AC-604) were added. While the resultant emulsion was being agitated slowly a dilute aqueous solution of sodium dichromate (1 gram in 10 ml of water) was slowly added at the periphery of the rotating body until a pH of 8.4 was obtained.

The resultant emulsion coating composition was then applied to properly cleaned and surface prepared spangle hot dip galvanized panels to produce a wet coating having a thickness of 0.2 ml using a 0.2 mil draw bar. The coated panels were preheated at 160° F. for 30 seconds, cured at 600° F. for 60 seconds, 90 seconds and 120 seconds respectively. They were then subjected to indirect impact tests at 120 ft.-lbs. and showed no pullaway but with some fracturing of galvanize crystals appearing. A pencil hardness test gave a 3H to 2H to all panels.

All of the panels were then placed in boiling water for one hour and tested for pencil hardness after a 15 minute recovery period. The panel with the 60 second cure softened badly and absorbed water. The panel with the 90 second cure softened somewhat and the panel with the 120 second cure recovered with very little change as compared with the panel before the boiling water test. The 120 second cure panels when subjected to indirect impact testing at 120 ft.-lbs. gave no tape pullaway.

Coated panels prepared as previously described will adhere to finishing coats including, for example, polyester (e.g., PPG-JJ-487 Duracron), acrylic (e.g. PPG 11W30, Duracron 100, DuPont 876-5461 876-559 and 876-5484), polyvinyl chloride (e.g., Sherwin-Williams G-77WC198), modified silicone (e.g., 64X423), modified polyester (e.g., Dexstar 5X100A), modified epoxy (e.g., Dexstar 9X165), and aqueous resin coatings (e.g., Armorcote 11 White).

Since all of the chromate-type primers have a decided color, whenever a top coating is to be white or pastel in color, there is produced a decided color detraction after the baking operation. To offset this effect rutile titanium dioxide is incorporated and sometimes the addition of a blue pigment dispersible in water (e.g., Hercules Imperial A-984, or X2925) to improve the final color effect for whites, blues and greens. For other shades some comparable color pigments akin to the desired color tone can be added. These tend to block out or hide the color effect of the active chromates contained in the prime coating.

As will be apparent from the foregoing description, the emulsion conating compositions prepared in accordance with the invention can contain a wide variety of ingredients in various proportions. In general, however, these compositions fall into two main categories depending upon whether the resinous binder is a thermoplastic resin or a combination of thermoplastic and thermosetting resins. Where the resinous binder is solely a thermoplastic resin, the composition of the emulsion is preferably as follows:

| | |
|---|---|
| Thermoplastic resin (e.g., Rhoplex MV-1) | 50–95% (Vol.) |
| Water | 45–0 % (Vol.) |
| Dilute inorganic chromate solution (e.g., Na$_2$Cr$_2$O$_7$) | Enough to give a pH of 5.5–9.0 |
| Pigment (e.g., SrCrO$_4$ or CaSiF$_6$, or chromate containing CaSiF$_6$) | 0–1% (wt.) |
| Coalescing agents (e.g., tributyl phosphate) | 0.5–3% of the resin (Vol.) |
| Surfactant (Triton CF10) | Trace to 0.1% of resin |
| Thickening Agent (Acrysol G-110) | Trace to 0.5% of resin |
| Titanium dioxide | 0–5% (wt.) |
| Dispersing agent (e.g., Tamol 850) | 0–0.5% of pigment (wt.) |

In the case of a composition containing both thermoplastic and thermosetting resins a preferred composition contains:

| | |
|---|---|
| Thermoplastic resin (e.g., Rhoplex MV-1 | 15–60% (vol.) |
| Thermosetting resin (e.g., Rhoplex AC-604) | 10–60% (vol.) |
| Water | 10–4% |
| Dilute chromate solution (e.g., Na$_2$Cr$_2$O$_7$) | Enough to give pH of 6.8–9.5 |
| Pigment (e.g., SrCrO$_4$, CaSiF$_6$ or chromate containing CaSiF$_6$) | 0–1% (wt.) |
| Coalescing agents (e.g., tributyl phosphate) | 0.5–3% of the resin (vol.) |
| Surfactant (Triton CF10) | Trace to 0.1% of resin |
| Thickening agent (Acrysol G-110) | Trace to 0.5% of resin |
| Titanium dioxide | 0–5% (wt.) |
| Dispersing agent (e.g., Tamol 850) | 0–0.5% of pigment (wt.) |

In these compositions ammonium hydroxide, dimethylethanolamine, or diethanolamine are added with or without the thickener to obtain a desired viscosity which is within the range of 20 to 45 seconds on a Zahn No. 1 cup and 17 to 35 seconds on a Zahn No. 2 cup. The method of application and desired dry-film thickness will determine the viscosity value, along with the equipment for curing such applied film.

Certain catalysts can be incorporated to: increase the speed of cure, and/or lower the "cure" temperature. Such materials are, for example, thiocyanates (provided iron is not present to cause discoloration), toluene sulfonic acid, and phosphoric acid. It is suggested that if such be used, this along with other additives such as water, for viscosity control, should be added just prior to mixing (at usage station).

Also, it is desirable to keep the organic film-coating mixture at a pH value of 8.0 to 8.5 and make the final adjustment along with the aforementioned additions. The affords a more accurate pH control for whatever the desired pH value may be.

In practicing the invention many different methods of adding dilute solutions of the water soluble chromium containing compounds were tried including (1) injection using a pump into the middle of the liquid body; (2) injection using a high volumn circulating pump by drawing from the bottom of the tank and then discharging into the middle of the liquid body or onto the liquid surface; (3) pouring the dilute solution in the vortex produced by a high speed mixer; (4) pouring powdered chromium containing material into the vortex of the liquid body (these gave very poor results); (5) adding approximate amounts of the dry chromium containing compound to water to be used and then adding the resinous emulsion; (6) adding both solid chromium containing compound and diluted solution separately into the final adjusted liquid mix; and (7) spraying diluted chromium containing solution onto and into the rotating liquid mixture containing the resin. None of these methods gave results as good as the preferred method described herein wherein a dilute aqueous solution of the chromium compound was added gradually to a peripheral portion of the rotating body.

The success of the process appears to depend upon a combination of the factors previously outlined, namely, the gradual addition of a dilute aqueous solution of an inorganic ionizable water soluble hexavalent chromium compound having a concentration of 1 to 10% by weight, calculated as Cr, cooling so that the temperature does not exceed 90° F., maintaining a pH within 2 to 10.5 and maintaining the body of emulsion in a non-foaming state. The use of these conditions reduces esterification and aldehyde formation and the amount of sediment formed in the process. In the final analysis the amount of sediment formed is a measure of the success of the process. Under the worst conditions large amounts are formed whereas under the conditions employed herein it is possible to practice the process so that no more than 25 to 35 grams of sediment is produced in a 55 gallon batch.

Calcium silicofluoride is preferred when a pigment is employed in the practice of the invention because when the coating composition containing it is applied as a coating to a substrate and baked decomposition occurs to form calcium silicate which is very water insoluble. Similarly, magnesium silicofluoride (MgSiF$_6$), strontium silicofluoride (SrSiF$_6$) and/or barium silicofluoride (BaSiF$_6$) can be used, although calcium silicofluoride is preferred.

In carrying out the process, a mixed pigment can be prepared by adding at least one chromium compound selected from the group consisting of chromic acid, strontium chromate, zinc chromate and lead chromate to a slurry of an inorganic calcium, magnesium, strontium or barium compound and said inorganic silicofluoride, the quantity of said chromium compound being within the range of 0.05 to 50% by weight of the total solids.

Coating compositions are prepared by mixing the magnesium, strontium or barium or calcium silicofluoride pigment slurry in which the pigment particles are usually in very fine form, e.g., an average particle size of 0.5 to 10 microns, or a mixed pigment containing such silicofluoride and an inorganic chromium compound of the type previously described with emulsions of thermoplastic resin, thermosetting resins, or mixtures of thermoplastic resins and thermosetting resins in water where water is the continuous phase, preferably with the addition of at least one hexavalent inorganic chromium compound such as, for example, chromic acid or sodium dichromate, pigments and pigment extenders other than calcium silicofluoride, driers such as naphthenates of cobalt, lead, magnesium, manganese, zinc and/or zirconium, coalescing agents, dispersants, defoamers, surfactants and water soluble additives such as ammonium hydroxide, dimethylethanolamine and diethanolamine to enhance stability of the emulsion. Additional water is usually required over that normally present in commercial emulsions of resinous binders.

Preferred coating compositions coming within the scope of the invention consist essentially of the following:

| Ingredients | Weight % |
| --- | --- |
| (a) resin solids of at least one organic film forming resin selected from the group consisting of thermoplastic resins, thermosetting resins, and mixtures thereof | 10–60 |
| (b) calcium, magnesium, strontium or barium silicofluoride | 0.5–20 |
| (c) hexavalent inorganic chromium compound as Cr | 0–10 |
| (d) pigments and pigment extenders other than (b) | 0–100 of resin |
| (e) driers | up to 0.5 of total solids |
| (f) coalescent agents | 0.05–10 |
| (g) dispersants | 0.05–6 |
| (h) defoamers | 0–0.05 |
| (i) surfactants | 0.01–3 |
| (j) thickening agents (viscosity and required film thickness-determinants) | trace to 10.0 by weight of resin |
| (k) water including water soluble additives | 5–65 |

The organic film forming compositions herein described containing calcium, magnesium, strontium and/or barium silicofluorides are not only useful as primer coatings which accept other organic coatings such as paints, e.g., water based or water reducible paints, but also act as adhesive coatings for self-supporting organic sheets or films such as polyacrylic films, polyethylene, polypropylene, polyvinyl fluoride (Tedlar) and regenerated cellulose (cellophane). The self-supporting sheets can be applied to aluminum, steel, or zinc surfaced sheets which have been previously coated with 0.1 to 0.3 mil thickness coating of the organic film forming composition and baked for 30 to 60 seconds at 450°–500° F. (metal temperature 350°–400° F.). The laminating sheet is applied while the coated metal is still hot enough to soften the laminating sheet and the laminated sheet is subjected to pressures of 300–400 psig between rollers. These products are useful as panel stock, gutters, industrial siding, and for many other purposes.

Aluminum coated with organic film forming compositions of the invention has resisted salt spray for at least 3,000 hours and as much as 7,200 hours without failure.

In the foregoing preferred coating compositions, where a hexavalent inorganic chromium compound is added the amount usually constitutes 0.05 to 10% by weight of the coating composition, calculated as Cr.

The invention is hereby claimed as follows:

1. A coating composition consisting essentially of:

| Ingredients | Weight % |
| --- | --- |
| (a) resin solids of at least one organic film forming resin selected from the group consisting of thermoplastic resins, thermosetting resins, and mixtures thereof | 10 – 60 |
| (b) silicofluoride of calcium, magnesium, strontium or barium | 0.5 – 20 |
| (c) hexavalent inorganic chromium compound as Cr | 0 – 10 |
| (d) pigments and pigment extenders other than (b) | 0 – 100 of resin |
| (e) driers | up to 0.5 of total solids |
| (f) coalescent agents | 0.05 – 10 |
| (g) dispersants | 0.05 – 6 |
| (h) defoamers | 0 – 0.05 |
| (i) surfactants | 0.01 – 3 |
| (j) thickening agents | trace to 10.0% by weight of resin |
| (k) water including water soluble additives added to enhance stability | 5 – 65. |

2. A coating composition as claimed in claim 1 in which (c) constitutes 0.05 to 10% by weight.

3. A metal coated with a coating composition as claimed in claim 1.

4. A metal coated with a coating composition as claimed in claim 2.

5. A coating composition comprising an emulsion of at least one organic film-forming resin selected from the group consisting of thermoplastic resins, thermosetting resins and mixtures thereof, together with 0.5–20% by weight of said composition of a silicofluoride of calcium, magnesium, strontium or barium and 0–10% by weight of said composition of a hexavalent inorganic chromium compound, calculated as Cr.

6. A metal coated with a coating composition as claimed in claim 5.

* * * * *

UNITED STATES PATENT OFFICE
CERTIFICATE OF CORRECTION

Patent No. 4,088,621      Dated May 9, 1978

Inventor(s) Russell C. Miller

It is certified that error appears in the above-identified patent and that said Letters Patent are hereby corrected as shown below:

The term of this patent subsequent to

January 10, 1995, has been disclaimed.

*Signed and Sealed this*

*Eleventh* Day of *July 1978*

[SEAL]

*Attest:*

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,088,621
DATED : May 9, 1978
INVENTOR(S) : RUSSELL C. MILLER

It is certified that error appears in the above-identified patent and that said Letters Patent are hereby corrected as shown below:

Column 1, line 60, "substantially" should read --substantial--.

Column 2, line 12, "organ" should read --organic--.

Column 9, lines 29, 30, 32, 66, "ft." should read --"--.

Column 10, lines 27, 39, "ft." should read --"--.

Column 10, line 63, "conating" should read --coating--.

Signed and Sealed this

Third Day of October 1978

[SEAL]

Attest:

RUTH C. MASON
Attesting Officer

DONALD W. BANNER
Commissioner of Patents and Trademarks